(12) United States Patent
Haug et al.

(10) Patent No.: US 11,256,806 B2
(45) Date of Patent: *Feb. 22, 2022

(54) SYSTEM AND METHOD FOR CYBER ATTACK DETECTION BASED ON RAPID UNSUPERVISED RECOGNITION OF RECURRING SIGNAL PATTERNS

(71) Applicant: HRL Laboratories, LLC, Malibu, CA (US)

(72) Inventors: Joshua Haug, Sierra Madre, CA (US); David W. Payton, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 307 days.

This patent is subject to a terminal disclaimer.

(21) Appl. No.: 16/449,130

(22) Filed: Jun. 21, 2019

(65) Prior Publication Data

US 2019/0318092 A1    Oct. 17, 2019

Related U.S. Application Data

(63) Continuation-in-part of application No. 16/219,749, filed on Dec. 13, 2018.

(Continued)

(51) Int. Cl.
| | |
|---|---|
| *G06F 21/56* | (2013.01) |
| *H04L 29/06* | (2006.01) |
| *G06F 21/55* | (2013.01) |

(52) U.S. Cl.
CPC .......... *G06F 21/566* (2013.01); *G06F 21/554* (2013.01); *G06F 2221/034* (2013.01)

(58) Field of Classification Search
CPC ............... H04L 63/14; H04L 12/40; H04L 29/06877; G06F 21/55; G06F 21/755; G06F 21/566; G06F 21/554; G06F 2221/034

See application file for complete search history.

(56) References Cited

U.S. PATENT DOCUMENTS

2008/0276111 A1    11/2008   Jacoby et al.
2014/0115405 A1     4/2014   Condorelli et al.
(Continued)

FOREIGN PATENT DOCUMENTS

| CN | 103488727 B | 5/2017 |
| WO | WO2009094413 | 7/2009 |
| WO | WO2016085861 | 6/2016 |

OTHER PUBLICATIONS

Notification of Transmittal of International Search Report and the Written Opinion of the International Searching Authority for PCT/US2019/038576; dated Oct. 11, 2019.

(Continued)

*Primary Examiner* — Izunna Okeke
(74) *Attorney, Agent, or Firm* — Tope-McKay & Associates

(57) ABSTRACT

A system for cyber-attack detection within cyber-physical systems (such as a vehicle). The system operates by obtaining a time-varying analog side-channel signal from components with the cyber-physical system and converting the time-varying analog side-channel signal to a digital side-channel signal. A time-series of system states are then identified based on the digital side-channel signal. The time-series of system states are compared with software states as generated by the cyber-physical system components, such that when the software states are unmatched with the time-series of system states, a side-channel is designated as having a security breach. In such an event, the cyber-physical system is then caused to implement an action based on the side-channel security breach.

23 Claims, 10 Drawing Sheets

Related U.S. Application Data

(60) Provisional application No. 62/684,181, filed on Jun. 12, 2018, provisional application No. 62/630,675, filed on Feb. 14, 2018, provisional application No. 62/722,783, filed on Aug. 24, 2018.

(56) References Cited

U.S. PATENT DOCUMENTS

| | | |
|---|---|---|
| 2015/0271201 A1 | 9/2015 | Ruvio et al. |
| 2016/0342791 A1* | 11/2016 | Aguayo Gonzalez ................... G01R 31/2887 |
| 2017/0270295 A1 | 9/2017 | Park et al. |
| 2018/0012020 A1 | 1/2018 | Prvulovic et al. |
| 2018/0012030 A1 | 1/2018 | Litichever et al. |
| 2018/0262527 A1* | 9/2018 | Jain ................... H04L 63/1475 |

OTHER PUBLICATIONS

International Search Report of the International Searching Authority for PCT/US2019/038576; dated Oct. 11, 2019.
Written Opinion of the International Searching Authority for PCT/US2019/038576; dated Oct. 1, 2019.
Notification of Transmittal of International Search Report and the Written Opinion of the International Searching Authority for PCT/US2018/065558; dated Apr. 9, 2019.
International Search Report of the International Searching Authority for PCT/US2018/065558; dated Apr. 9, 2019.
Written Opinion of the International Searching Authority for PCT/US2018/065558; dated Apr. 9, 2019.
Notification of the International Preliminary Report On Patentability Chapter 1 for PCT/US2019/038576; dated Mar. 11, 2021.
The International Preliminary Report On Patentability Chapter I for PCT/US2019/038576; dated Mar. 11, 2021.
Kocher, Paul, Joshua Jaffe, Benjamin Jun, and Pankaj Rohatgi. Introduction to differential power analysis. Journal of Cryptographic Engineering, 1(1): pp. 5-27, 2011.
Carlos R. Aguayo Gonzalez and Jeffrey H. Reed. Power fingerprinting in SDR & CR integrity assessment. In IEEE Military Communications Conference (MILCOM), pp. 1-7, 2009.
Shane S. Clark, Benjamin Ransford, Amir Rahmati, Shane Guineau, Jacob Sorber, Kevin Fu, and Wenyuan Xu. WattsUpDoc: Power side channels to nonintrusively discover untargeted malware on embedded medical devices. In Proceedings of the 2013 USENIX Conference on Safety, Security, Privacy and Interoperability of Health Information Technologies, HealthTech, pp. 1-11, 2013.
Office Action 1 for U.S. Appl. No. 16/219,749, dated Jun. 24, 2021.
Notification of the International Preliminary Report On Patentability Chapter 1 for PCT/US2018/065558; dated Aug. 27, 2020.
The International Preliminary Report On Patentability Chapter 1 for PCT/US2018/065558; dated Aug. 27, 2020.

* cited by examiner $Y_i$ = list of winning match scores for template $i$
$\eta$ = target length of $Y_i$
$\beta$ = percent of $Y_i$ entries that the new threshold should be above.

SYSTEM AND METHOD FOR CYBER ATTACK DETECTION BASED ON RAPID UNSUPERVISED RECOGNITION OF RECURRING SIGNAL PATTERNS

CROSS-REFERENCE TO RELATED APPLICATIONS

The present application is a Continuation-in-Part application of U.S. application Ser. No. 16/219,749, filed on Dec. 13, 2018, which is a non-provisional application of both U.S. Provisional Application No. 62/684,181, filed on Jun. 12, 2018, and U.S. Provisional Application No. 62/630,675, filed on Feb. 14, 2018, the entirety of which are incorporated herein by reference.

The present application is ALSO a non-provisional application of U.S. Provisional Application No. 62/722,783, filed on Aug. 24, 2018, the entirety of which is hereby incorporated by reference.

GOVERNMENT RIGHTS

This invention was made with government support under U.S. Government Contract Number D15PC00223. The government has certain rights in the invention.

BACKGROUND OF INVENTION

(1) Field of Invention

The present invention relates to system for identifying cybersecurity breaches and, more specifically, to a system for identifying cybersecurity breaches based on rapid unsupervised recognition of recurring signal patterns.

(2) Description of Related Art

Cyber-attack is a problem that plagues many industries and is accomplished through a variety of techniques. For example, many known attacks on automobiles involve some form of spoofing or altering CAN bus messages. For instance, if an attacker can cause another module to go into diagnostic mode, they can stop that module's messages from appearing on the bus and then they can replace those messages with their own. Depending on the module, these spoof messages can potentially put passengers in serious danger.

The most common use of side-channel information is to enable an attacker to uncover a hidden encryption key in order to break into a system (see the List of Incorporated Literature References, Literature Reference No. 1). Typically, these methods involve correlating side-channel emissions of a cryptographic device with various alternative inputs such that these variations can reveal the hidden key one bit at a time. In practical use, the attacker must have access to a side-channel measurement of the device hardware, such as power consumption, RF emissions, or acoustic emissions. The variations in these emissions, although very noisy, can be indicative of different bit strings being processed in the hardware, and therefore can reveal hidden information. A disadvantage of these methods is that they generally require averaging samples over a very large number of repeated trials in order to recover needed state information.

Others have made use of side-channel information as a means of checking software integrity in a computing system. In the work of Gonzalez et al, a cross-correlation method is used to compare processor side-channel power signatures to side-channel traces obtained from repeated runs (see Literature Reference No. 2). Signatures are obtained by hand-selecting specific sections of a captured power trace corresponding to a particular segment of code execution. In some cases, selected sections of a trace are obtained from multiple runs, aligned, and then averaged together to create a signature. Some of these steps are comparable to our own method, although in the work of Gonzalez et al. they need to capture signatures of malware as well as normal software to distinguish the differences. In the work of Clark et al., a set of statistical features of side-channel signals are first extracted before being processed by a classifier (see Literature Reference No. 3). The classifier is then trained to distinguish between normal and abnormal behavior. A disadvantage of both the work of Gonzalez et al. and Clark et al. is that they require multiple pre-existing examples of normal and abnormal behavior in order to perform their detection of intrusions.

Another aspect of the above prior art is that the specific states for which side-channel samples are extracted must generally first be identified or labeled by a person. Thus, the distinct states cannot be automatically identified using the current practice. While a variety of techniques for unsupervised learning may exist that could provide a means to capture distinct states from a stream of side-channel data, these existing methods generally require large amounts of unlabeled data for training.

Thus, a continuing need exists for a system for cyber-attack detection that is designed to work using unsupervised recognition of recurring signal patterns.

SUMMARY OF INVENTION

This disclosure provides a system for cyber-attack detection within cyber-physical systems (e.g., such as a vehicle). The system includes one or more processors and instructions encoded on a non-transitory computer readable medium to generate the necessary blocks and perform the operations as described herein. For example, the system includes a side-channel signal acquisition block. The side-channel signal acquisition block is operable for performing operations of obtaining a time-varying analog side-channel signal from components with the cyber-physical system and converting the time-varying analog side-channel signal to a digital side-channel signal. Also included is a state detection block. The state detection block is operable for performing operations of identifying a time-series of system states based on the digital side-channel signal, comparing the time-series of system states with software states as generated by the cyber-physical system components, such that when the software states are unmatched with the time-series of system states, designating a side-channel security breach; and causing the cyber-physical system to implement an action based on the side-channel security breach.

In another aspect, in identifying the time-series of system states based on the digital side-channel signal, the state detection block includes a side-channel template learning and acquisition block that performs an operation of storing new side-channel signal templates and retrieving and updating existing side-channel signal templates.

Further, the side-channel template learning and acquisition block separates the digital side-channel signal into a series of fixed-size signal blocks, and further performs on each fixed-size signal block operations of determining a match score for each existing side-channel signal template; performing a match of each existing side-channel signal template to a fixed-size signal block, such that: if there are no existing side-channel signal templates, then designating a number of matching signal templates as zero; and if there are existing side-channel signal templates, then generating a match score for each matching side-channel signal templates.

The system also performs an operation of comparing the match scores to a threshold value associated with each matching side-channel signal template to determine if there are one or more side-channel signal templates above the threshold.

Additionally, when there are zero matching side-channel signal templates, then the digital side-channel signal is considered to represent an unrecognized state, and a new side-channel signal template is generated for the unrecognized state.

In another aspect, when there is one matching side-channel signal template, the digital side-channel signal is considered to be a recognized state and the matching side-channel signal template is evolved.

Further, the matching side-channel signal template is evolved by finding additional matches to the matching side-channel signal template and combining those matches with an original matching side-channel signal template to average out noise.

In yet another aspect, when there are two or more matching side-channel signal templates, then a selection procedure is employed to select a best matching side-channel signal template.

Additionally, the side-channel signal acquisition block further comprises a differential amplifier electronically connected across a fuse within a vehicle components module to generate the time-varying analog side-channel signal.

In yet another aspect, the threshold value for comparing match scores is different for each template and each threshold is adjusted according to the set of recent match scores achieved for associated templates.

In another aspect, the cyber-physical system is a vehicle such that causing the cyber-physical system to implement an action includes triggering a safe-mode for the vehicle. In one aspect, triggering the safe-mode includes causing the vehicle to cease operation.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
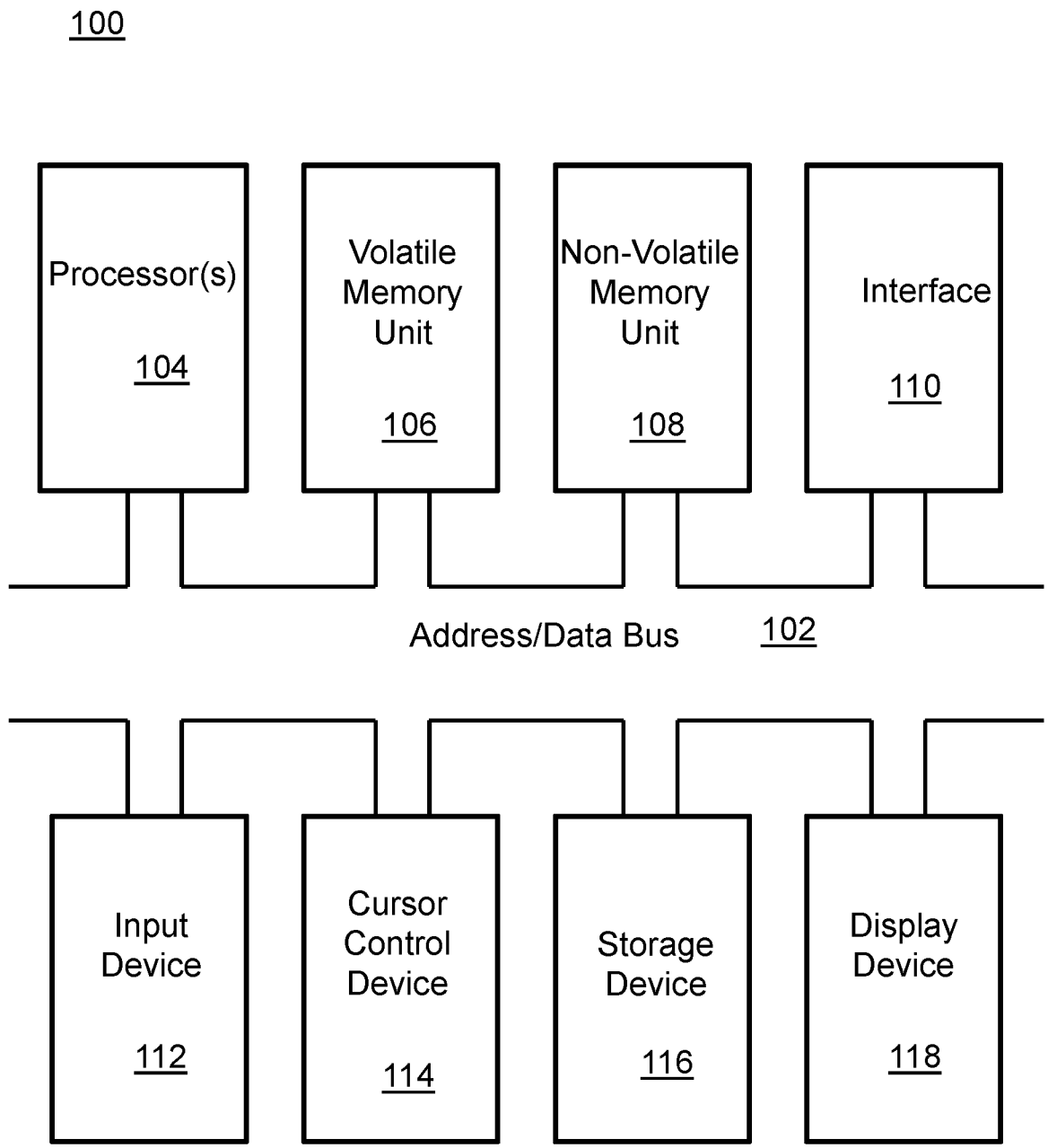
FIG. 1 is a block diagram depicting the components of a system according to various embodiments of the present invention.

The present invention relates to a system for identifying cybersecurity breaches and, more specifically, to a system for identifying cybersecurity breaches based on rapid unsupervised recognition of recurring signal patterns. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Kocher, Paul, Joshua Jaffe, Benjamin Jun, and Pankaj Rohatgi. Introduction to differential power analysis. *Journal of Cryptographic Engineering*, 1(1):5-27, 2011.
2. Carlos R. Aguayo Gonzalez and Jeffrey H. Reed. Power fingerprinting in SDR & CR integrity assessment. In IEEE Military Communications Conference (MIL-COM), 2009.
3. Shane S. Clark, Benjamin Ransford, Amir Rahmati, Shane Guineau, Jacob Sorber, Kevin Fu, and Wenyuan Xu. WattsUpDoc: Power side channels to nonintrusively discover untargeted malware on embedded medical devices. In *Proceedings of the* 2013 *USENIX Conference on Safety, Security, Privacy and Interoperability of Health Information Technologies*, HealthTech, 2013.

(2) Principal Aspects

Various embodiments of the invention include three "principal" aspects. The first is a system for rapid unsupervised recognition of recurring signal patterns. The system is typically in the form of a computer system operating software or in the form of a "hard-coded" instruction set any other hardware or components as may be necessary to implement the system described herein, including a processor, amplifier and A/D converter to digitize the analog side-channel signals. This system may be incorporated into a wide variety of devices (e.g., such as an automobile, etc.) that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 (or speech recognition) coupled with the address/data bus 102, wherein the cursor control device 114 (or other input technique or device) is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands, or, in some aspects, there is no cursor control and directions can be input strictly by voice command or any other desired technique.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
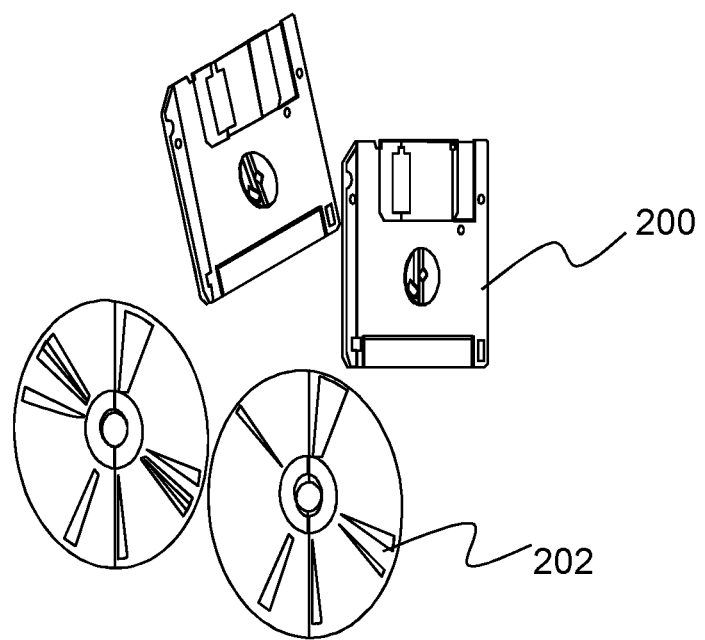
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a system and method to improve cyber-defense mechanisms within cyber-physical systems by making use of secondary side-channel information. It should be noted that the term cyber-physical system refers to the broad category of systems that could employ cyber-defense mechanisms, non-limiting examples of which include vehicles (e.g., automobiles, unmanned aerial vehicles, etc.). It is well known that side-channels such as power consumption or RF emissions can be used to conduct cyber-attacks involving decryption of secret keys. It was previously shown that one could use component power consumption, RF emissions, or similar side-channel signals, to defend against attacks by reliably identifying vehicle sub-system states. One challenge with such a side-channel method is obtaining reliable and repeatable signatures of system states when the side-channel signals are noisy. The invention of the present disclosure is designed to overcome this difficulty by providing the ability to automatically acquire signatures of identifying states in the presence of noisy signals and to be able to consistently identify when these states occur during vehicle operation. The invention of the present disclosure also has broad applicability beyond vehicle cyber security because it is able to capture regular recurring features in any time-domain signal.

Many known attacks on automobiles involve some form of spoofing or altering CAN bus messages. For instance and as noted above, if an attacker can cause another module to go into diagnostic mode, they can stop that module's messages from appearing on the bus and then they can replace those messages with their own. Depending on the module, these spoof messages can potentially put passengers in serious danger. The system of the present disclosure defends against attacks like this by looking at the relationship between CAN bus messages and side-channel signals to find inconsistencies. This process is based on the assumption that any attempt to spoof messages on the bus will cause the appearance of discrepancies between bus messages and side-channel states. If the system can detect such discrepancies, then the operator or system has a chance to detect a wide range of different attacks. Because this method can detect inconsistencies between two signals that ordinarily should be consistent, it can provide a reliable indicator of novel cyber-attacks for which there may be no pre-existing examples to train on.

This disclosure provides a marked improvement over the prior art because other methods are not designed to work in an unsupervised mode where they can automatically capture signal templates for distinct states from a single real-time pass over a continuous unsegmented stream of data. Furthermore, without any pre-labeling or pre-segmenting of the data into distinct categories, other methods would have difficulty incorporating the ability to distinguish between differences due to noise versus differences due to actual state changes. The present method provides the ability to dynamically update templates to average out noise signals while also automatically creating new templates when the side-channel signal changes due to transitions between states.

(4) Specific Details of Various Embodiments

The present disclosure provides a system and method for capturing templates for side-channel signals that can be used to help identify system states and thereby defend a cyber-physical system (e.g., vehicle) from cyber-attacks. The invention is applicable to a system designed to use side-channel signals to detect a hacker's attempt to alter software or software behavior on vehicle control modules. In such systems, it is generally necessary to obtain side-channel templates or signatures corresponding to normal system behavior in order to detect deviations from these normal behaviors that might constitute an attack. The particular focus of this disclosure is on the automated acquisition of these templates from noisy unlabeled side-channel signals.

Figure 3:
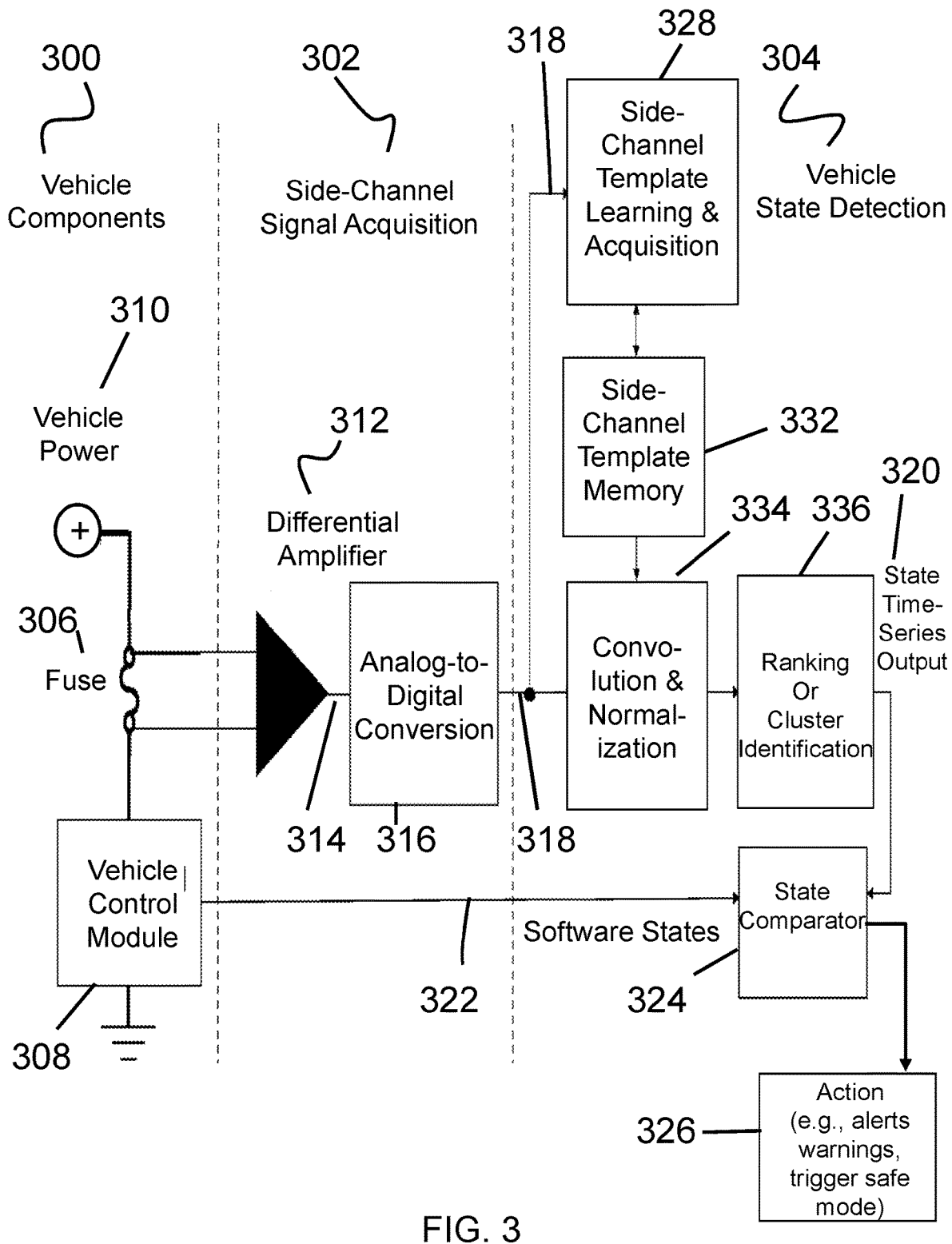
FIG. 3 is a flowchart illustrating a Side-Channel Template Learning and Acquisition module according to various embodiments of the present invention, shown as a component of vehicle state detection block.

As shown in FIG. 3, the invention of this disclosure can be fit in the context of a larger system. FIG. 3 depicts three distinct blocks: a vehicle components block 300, a side-channel signal acquisition block 302, and a vehicle state detection block 304. The side-channel state detection block 304 or module enables automatic capture of relevant side-channel templates in the presence of noise.

Together, the vehicle components block 300 and signal acquisition block 302 show a process for acquiring side-channel signals from a typical automobile (or other cyber-physical item, such as a vehicle or device in which the present system is implemented, such as an airplane, drone, etc.). Although not limited thereto, this particular example is one involving measurement of a voltage drop across a fuse 306 from vehicle power supply 310. The fluctuations in voltage are a useful side-channel for detecting changes in power consumption of a vehicle control module 308.

Because the fuse 306 imposes a small resistance, the changes in voltage across this resistance are indicative of fluctuations in power consumption by the connected subsystem (e.g., vehicle control module 308). To sense these fluctuations, a differential amplifier 312 is used across the two terminals of the fuse 306 (or other component as applicable to the particular system) to obtain a resulting time-varying voltage (i.e., analog side-channel signals) at the output of the amplifier 312. This time-varying analog signal 314 is then converted 316 to a digital signal (digitized side-channel signal 318) that is processed to obtain a time-varying state of the sensed module (i.e., time-series of system states 320). Analog to digital conversion 316 can be performed using any suitable analog-to-digital (A/D) converter, a non-limiting example of which includes the TLC549CP chip as created by Texas Instruments, located at 12500 TI Boulevard Dallas, Tex. 75243 USA.

Other techniques for signal acquisition might involve using a current meter on a module's power supply 310, an electro-magnetic pickup near a processor component within a module, an acoustic or vibration sensor, or other related methods. As a side-channel signal is acquired, the role of the Vehicle State Detection block 304 is to continuously identify the current vehicle state based on the side-channel signal. As a real-time signal is processed, this produces a time-series of vehicle states 320 that is then matched (by a state comparator 324) against identified software states 322 produced by the monitored vehicle module 308. In some aspects and as a non-limiting example, these states can be obtained from a CAN bus. The software states 322 are obtained from status messages generated from within the software of the control module 308 itself. For instance, in a vehicle transmission control module, it is standard for that module software to transmit messages related to the transmission states such as "drive," "reverse," "park," etc. Because these states defined by the vehicle control software are readily associated with unique power consumption signatures, it is possible to match vehicle states 320 as determined from side-channels to various software states 322. When software states 322 do not match to states 320 identified from side-channel analysis, the system has likely identified an instance wherein an attacker may be attempting to modify the behavior of the vehicle control module 308 or may be attempting to broadcast false information to other control modules about the state of module 308. The state comparator 324 is used to identify such mismatches. The state comparator 324 compares software states 322 with states 320 from side-channel analysis and, when a sufficient number of mismatches occur within a specified time window, the vehicle state detection module 304 initiates an action 326. The actual number of mismatches and the duration of the time window will depend on specifics of the module being monitored and the potential sensitivity to errors. For instance, if a module transmits 100 state updates per second, we may wish to see at least 20% of these to be mismatches within a 5 second period in order to have a high confidence that some corrective action should be taken. Examples of actions 326 may include alerts or warnings to the driver, or may possibly trigger a special safe-mode for the vehicle to switch out of any modes that might allow a hacker to take over control (such as turning off internet or online access, or causing the vehicle to brake and cease operation until the system is serviced to review any cyber threats, etc.) In general, the more drastic the action performed, the higher should be percentage of mismatches that must be detected before such action is triggered.

In order for the Vehicle State Detection block 304 to generate an output time series of system states 320, it requires a set of side-channel templates to use to match against the incoming side-channel signals. In U.S. application Ser. No. 16/219,749, the inventors described a way of acquiring these templates using a manual process. The present disclosure provides a way of acquiring the templates automatically, using a side-channel template learning and acquisition module 328. After acquiring the templates, the system performs convolution and normalization 334 and ranking or cluster identification 336 using the processes, for example, as described and illustrated in U.S. application Ser. No. 16/219,749 as elements 610 and 614 (of the '749 application), respectively.

As shown in FIG. 3, the side-channel template learning and acquisition module 328 receives inputs in the form of digitized side-channel signals 318, and interacts with a side-channel template memory 332 to store new templates as well as retrieve and update previously stored templates. A top-level functional breakdown of the side-channel template learning and acquisition module 328 is shown in FIG. 4.

Figure 4:
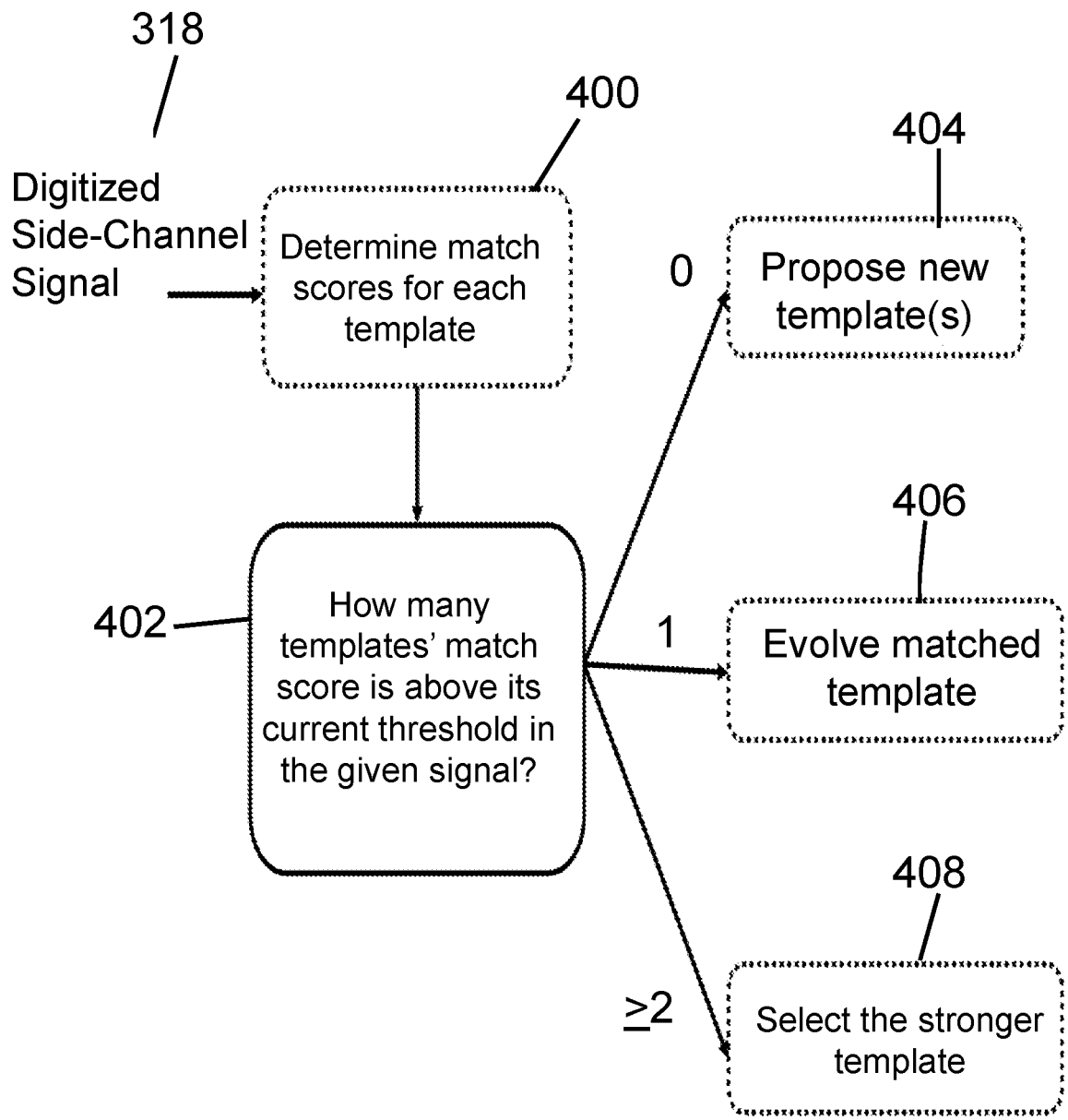
FIG. 4 is a flowchart depicting a top-level view of functions within the Side-Channel Template Learning and Acquisition module according to various embodiments of the present invention.

As shown in FIG. 4, the incoming digitized or digital side-channel signal 318 is broken down into a series of fixed-sized blocks, and the steps shown in FIG. 4 are performed on each block. As shown in the figure, the first step is to determine a match score 400 (described in further detail below) for each template and then perform a match 402 of each existing template to the incoming signal. If there are no existing templates in the side-channel template memory (i.e., element 332 in FIG. 3), then the number of matching templates will be zero. If there are templates present, then each template will receive a match score and each template's match score will be compared to a threshold value associated with the template. In a desired embodiment, each template may have its own unique threshold value that may be changed, but it is also possible to simply use a single constant threshold value for all templates.

After comparing template match scores to their individual thresholds, the system will have either zero templates above threshold, one template above threshold, or more than one above threshold. If there are zero templates above threshold, then the incoming signal is considered to represent an unrecognized state, and a procedure is performed to propose new templates 404 for that state. If there is just one template above threshold, then this is considered to be a recognized state and a procedure is performed to "evolve" 406 that matching template to become more robust to noise. If there are multiple templates above threshold, then a selection procedure is employed to select the stronger template 408 to ensure that eventually only the best matching template survives. Together, these procedures serve to automatically create new templates for previously unknown states, to refine existing templates when multiple samples are available, and to eliminate duplication of templates when more than one are found to match a given state. Details of each of these procedures is provided below.

(4.1) Determine Match Scores

Figure 5:
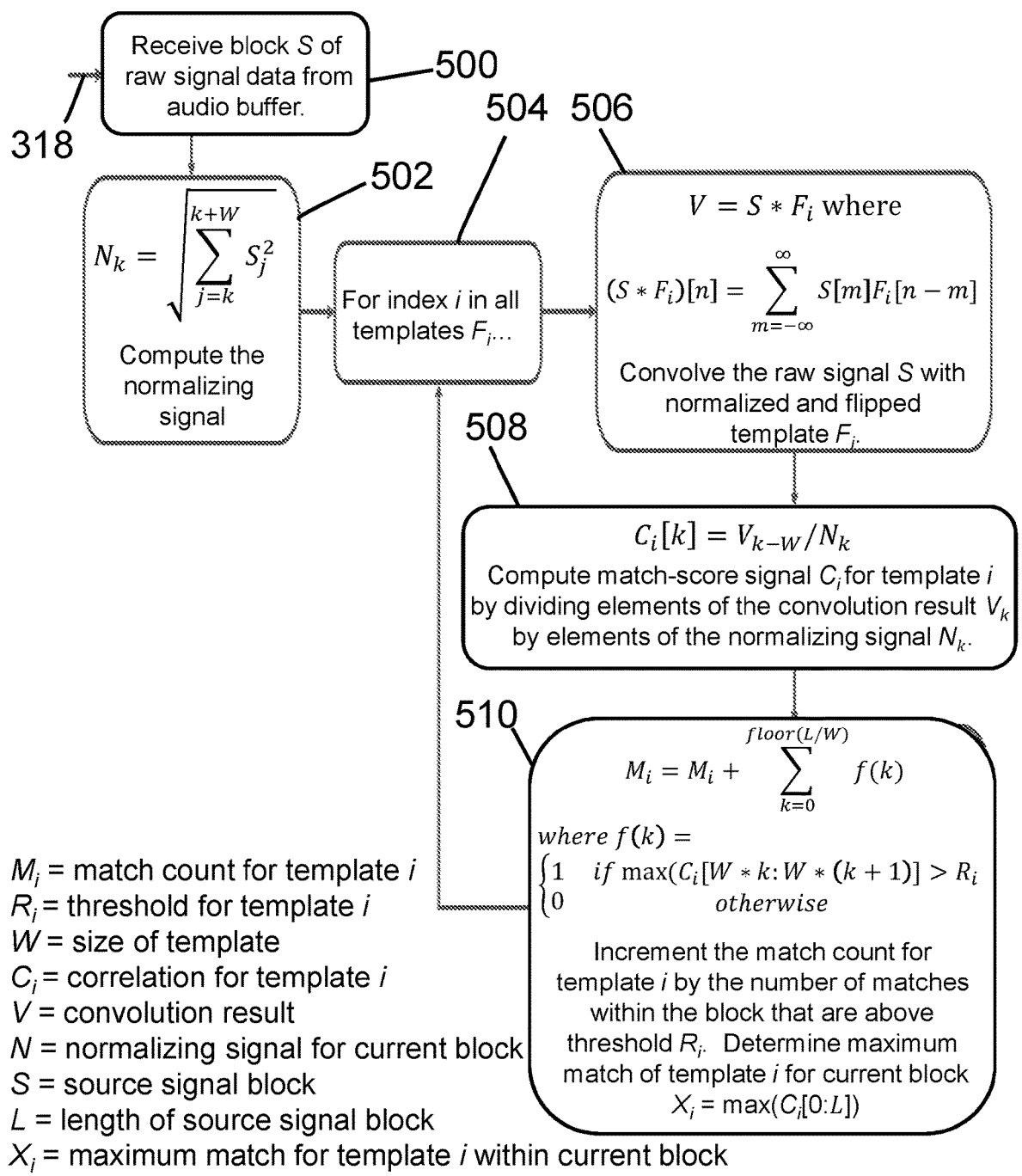
FIG. 5 is a flowchart depicting steps involved in Determine Match Scores according to various embodiments of the present invention.

The first step before any new templates are created or existing templates are modified is to analyze the incoming side-channel signal and determine match scores 400 for each existing template. This determine match scores 400 procedure for each template is shown in FIG. 5 and operates as follows. After capture, the incoming signal 318 is divided 500 into blocks S of size L samples. The signal coming in is continuous, so the process captures one block S of size L at a time and processes it while the signal continues to be buffered in a memory. The buffer is constantly getting filled up with data, with a block of L samples periodically being pulled from it. A block S is then processed to compute a normalizing signal N 502 where $N_k$ is $k^{th}$ element of N is a square root of the sum of squares of elements $S_j$ over a fixed length W with offset k where W corresponds to the fixed sample length used for templates.

Once the normalizing signal N is computed for a given input block S, the system then performs the following steps over a specified set of templates. If this procedure is called on a new block of signal data, then the templates processed are from the set of all templates in the template memory. If the procedure is called for newly proposed templates, then it is just applied to those templates exclusively. For each such template 504 (i.e., index i in all templates $F_i$ . . . ), do the following, first convolve 506 the template with the signal block to produce a convolved signal V. Then, compute the match score signal $C_i$ 508 by dividing the elements of V by corresponding elements of N, accounting for the offset W produced from convolution. This result, $C_i$, will be the vector of match scores for the template i. The system then sub-divides this result C into L/W segments of size W, the size of the templates. Within each segment, the system determines the maximum match score. Then, if this maximum is greater than a threshold $R_i$, the system increments the match count $M_i$ 510 for the template by one. Finally, the system determines the maximum match score $X_i$ (shown in block 510) for the template in the current block and then continues on to process the next template in the same way.

(4.2) Propose New Templates

Figure 6:
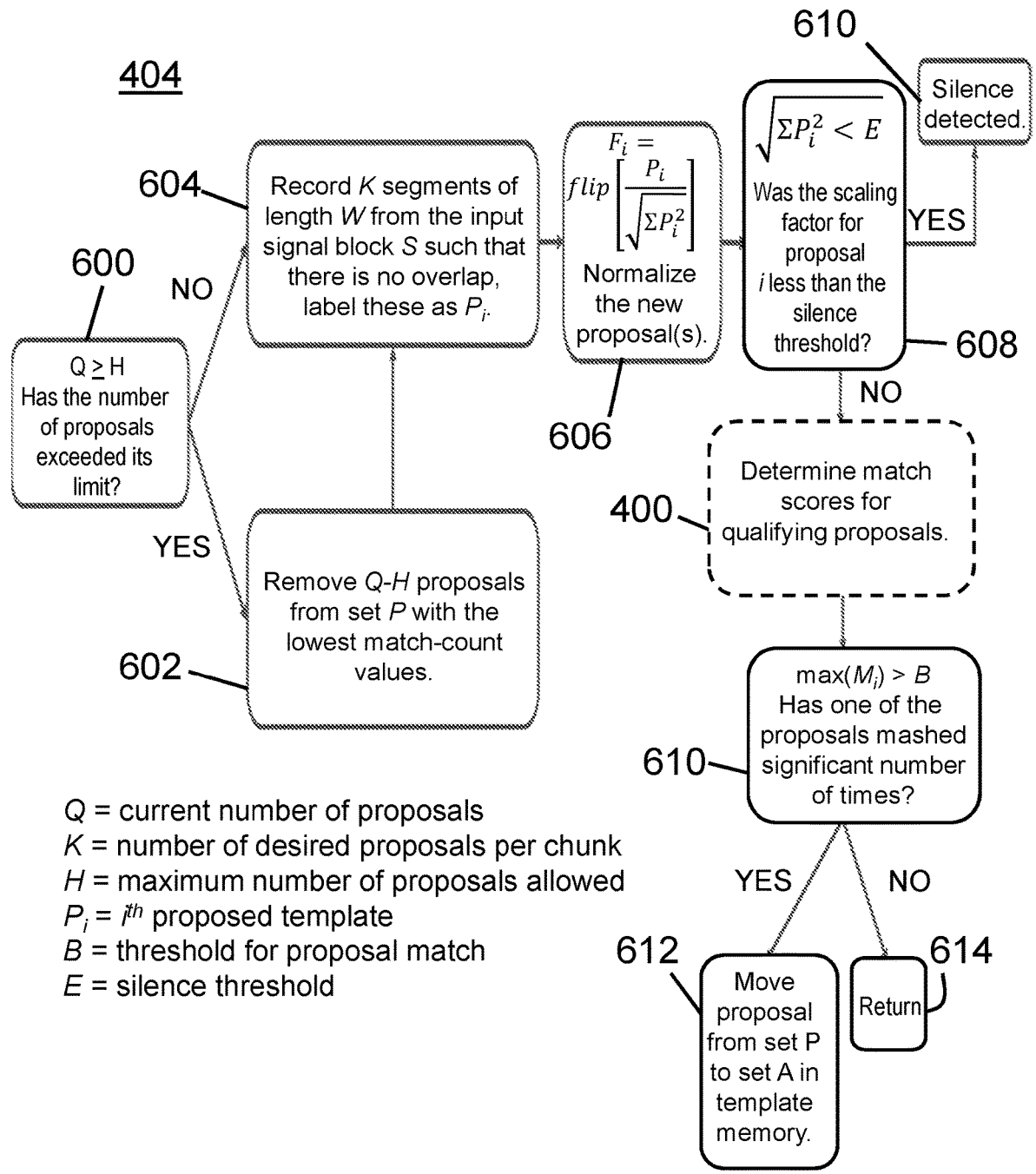
FIG. 6 is a flowchart depicting steps involved for Propose New Templates according to various embodiments of the present invention.

When the Determine Match Scores step finds no templates exceeding their match threshold $R_i$, the system uses the propose new templates 404 procedure to create a set of candidate templates for future consideration. This step is depicted in FIG. 6. It is important to note first that the template memory is partitioned into two sets. There is a set of proposed templates P and a set of active templates A. During normal operation, the only templates used to classify states are in the set A, but when the system first creates templates, they are placed in the set P and these are only promoted to the set A when they have achieved a number of matches $M_i$ that exceeds a threshold B needed to qualify for promotion. In the meantime, prior to promotion, proposed templates $P_i$ remain in the template memory between successive input blocks S and are added to or deleted as needed to maintain a total number of proposals Q that does not exceed a pre-set quantity H.

The system begins the propose new templates 404 step by first comparing 600 the current total of proposals Q to the limit threshold H. If the number of proposals Q exceeds H, then the system deletes the proposals 602 with the lowest match count $M_i$ until there are no more than H proposals in the template memory. Next, the system extracts 604 from signal block S a set of non-overlapping sub-segments K of length W. These segments are proposed templates $P_i$ which are then normalized 606 and flipped in time-order. The normalization 606 of a proposed template is performed by treating the template as a vector and dividing each element of the vector by the magnitude of the vector (defined as the square root of the dot-product). At this time, the system then tests 608 whether the magnitude of the vector is above a minimum threshold E. If it is not, then this template is considered to be uninteresting silence 610 and is discarded. Otherwise, the new normalized template $F_i$ is added to the set P in the template memory and the system processes the template through the determine match scores 400 step to obtain a match score which is then used to determine 610 if a number of matches $M_i$ for the new proposed template exceeds a significant number of times (i.e., threshold B). For example with respect to threshold B, a set of proposed templates P is kept separate from the set of active templates A that are regularly used to identify states. The promotion of a template from the proposed set P to the active set A is determined by a design parameter B that says any template in P must have at least matched to an input signal more than B times. A typical value for B may be in the range of 10 to 30. If this number Mi exceeds a threshold B, then the proposed template is moved 612 from set P to set A in template memory so the template may now be considered ready for use in classification of vehicle states. Alternatively, if this number $M_i$ is below threshold B, then return 614 to determining match scores.

(4.3) Evolve Matched Template

Figure 7:
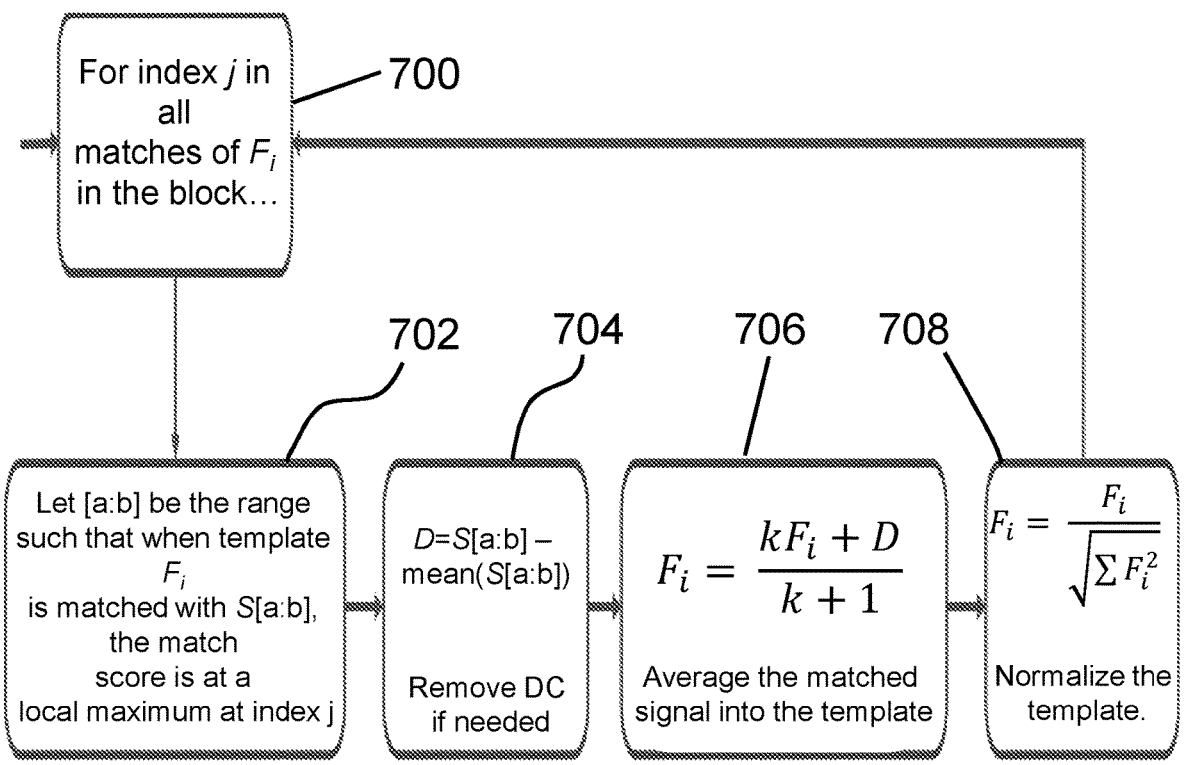
FIG. 7 is a flowchart steps involved for Evolve Matched Template according to various embodiments of the present invention.

When the determine match scores 400 step finds just one template exceeding its match threshold $R_i$, the system uses the evolve matched template 406 procedure to refine the template. The evolve matched template 406 procedure is depicted in FIG. 7. When there is only one matching template, this is considered to be an example of a proper detection of a distinct state. A goal in this step then is to improve the template for that state by removing any noise components from the template. The removal of noise components is performed by finding samples from the signal block S that best match the template and averaging them in with the existing template so that any differences are averaged out.

The specific procedure for evolve matched template 406 is as follows. First, the result from convolving template $F_i$ 700 is applied over the signal block S to find the set of indices j where the local match score is largest 702. The process proceeds by next extracting sub-segments of S with length W starting at positions corresponding to these indices. Essentially, these will be sub-segments of S that most closely match the shape of the matching template $F_i$. For each of these sub-segments, the system first removes 704 any DC component from them by subtracting the mean value, and then averages the weighted signal back into the template 706 by adding the result D to the original template $F_i$ using a weighted running average method. Finally, the system normalizes the resulting vector 708 and saves it back to template memory. This results in an averaged signal that will tend to contain only the signal features most relevant to identifying the state.

(4.4) Select the Stronger Template

The next case of interest is when there are multiple templates in template memory that match well to the current state. In this case, each template will have a match score that exceeds the template's threshold $R_i$. Here, a goal is to remove any extra templates, but only if they are redundant to the ones the system already has. In other words, it is desirable to allow for multiple templates to match for a given state if the state contains significantly different signal patterns within a given signal block S. However, if there is significant similarity between the matching templates, then it is desirable to choose only the best of these and eliminate the redundant ones.

Figure 8:
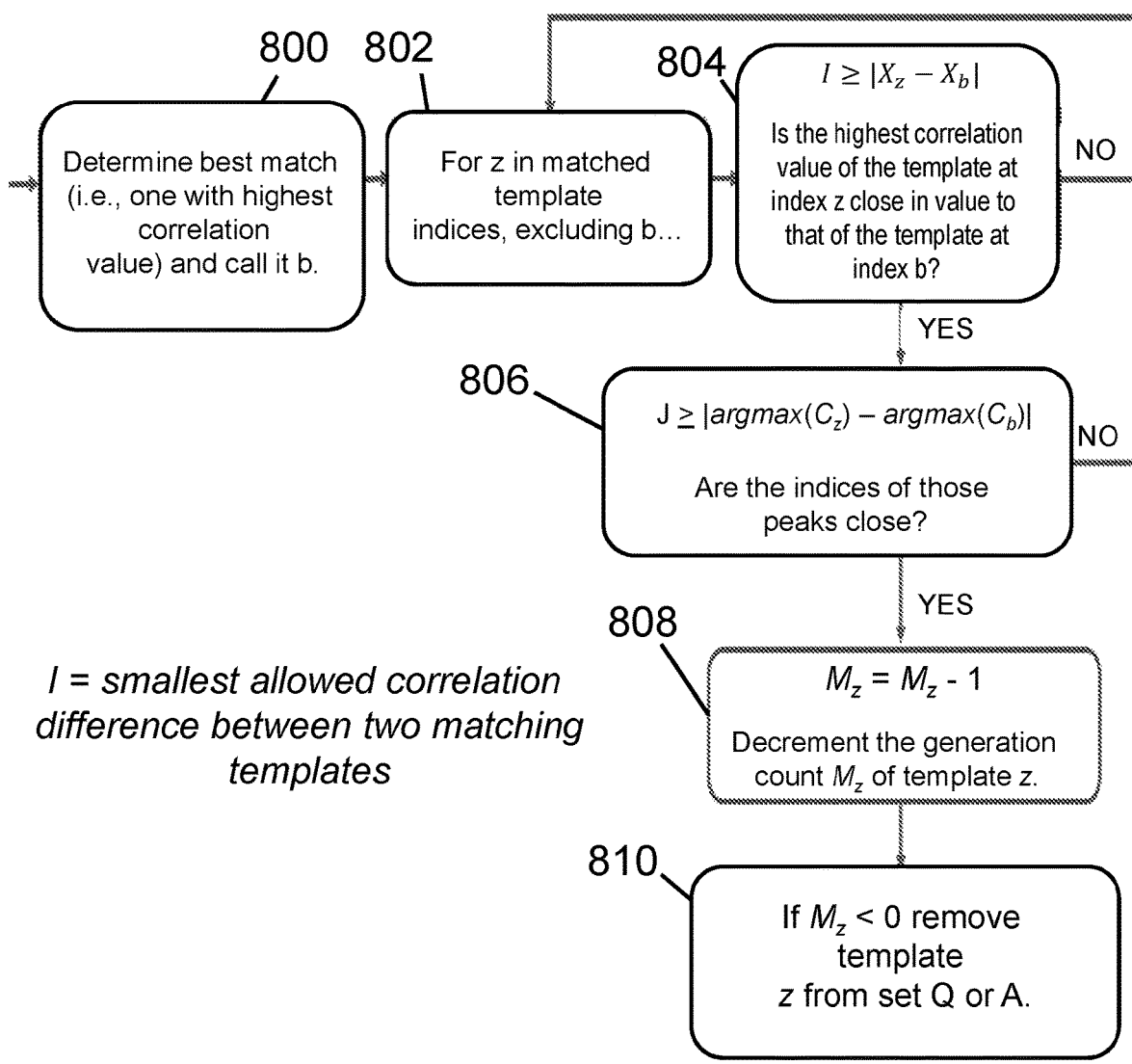
FIG. 8 is a flowchart depicting steps involved for Select Stronger Template according to various embodiments of the present invention.

The procedure for Select Stronger Template, as shown in FIG. 8, is as follows. First, of the multiple matching templates, the system finds the best match 800 by comparing their maximum match scores $X_i$ and selecting the template $F_b$ with the overall highest match score (designated as b). The system then compares 802 the match scores $X_z$ of the remaining matching templates (excluding b) with $X_i$. For each of these templates with a match score that is within a threshold I of $X_i$, the system tests 804 to see if region of signal S for which the template matches also has a significant overlap with the template $F_b$. Significant overlap is defined as, for example, greater than 70%; however, it should be noted that the invention is not intended to be limited thereto as this amount can vary depending on the application.

The system then determines if the position of their maximum matches is within a threshold J 806. If so, the system considers this to be a redundant template and the generation count $M_z$ is decremented 808 for the competing template $F_z$. Ultimately, if $M_z$ ends up below zero, the template $F_z$ is removed 810 from the template memory.

(4.5) Threshold Adaptation

Figure 9:
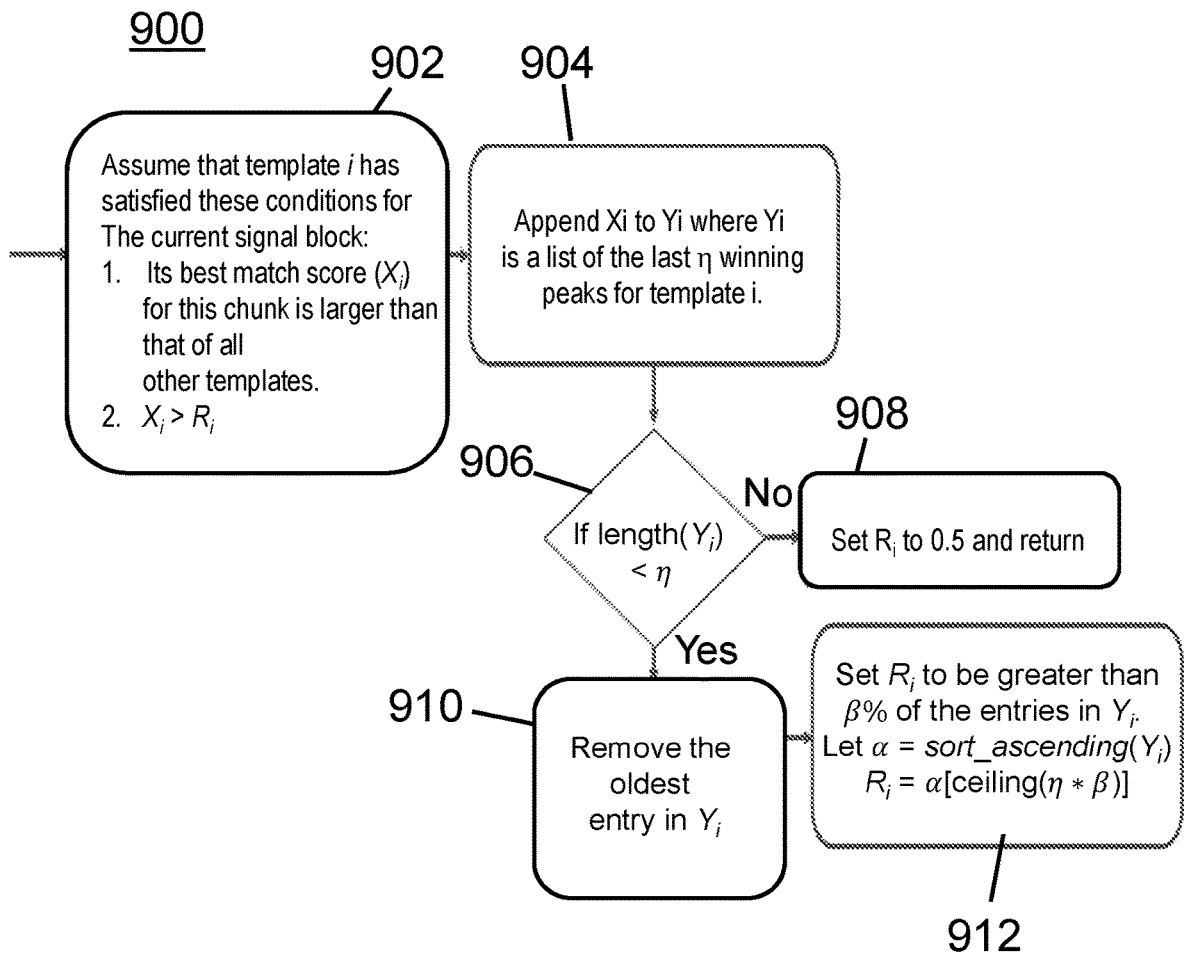
FIG. 9 is a flowchart depicting a procedure for threshold adaptation so that each template can have an independent threshold based on its prior history of match results according to various embodiments of the present invention.

As shown in FIG. 9, an optional step that can be performed as templates are refined is to perform threshold adaption 900 by modifying their matching threshold $R_i$ over time. If this optional step is implemented, it would occur following element 612 as depicted in FIG. 6. In a simple embodiment, the matching threshold R for all templates can be set to a constant value. Then, only the templates above this constant will be eligible to match. In a desired embodiment, a distinct threshold $R_i$ is given for each template and the threshold is altered dynamically. The dynamic updating for a template threshold is performed as follows. First, the system identifies a template i that satisfies certain conditions 902 for the current signal block, as follows: (1) the system determines the one template that has the match score $X_i$ that is larger than the match scores of all other templates; and (2) if the match score $X_i$ of this winning template is larger than the template's current threshold $R_i$ then perform the following update to $R_i$. For the template i that has satisfied the conditions, append 904 the new score $X_i$ to list $Y_i$, where $Y_i$ is a list of the most recent η winning scores for the template. If the length of list $Y_i$ is below the limit η 906, then set $R_i$ 908 to an initial default value, for example, 0.5 (an example default range is, for example, between 0.4 and 0.6, or any other predefined range). Otherwise, remove 910 the oldest score from $Y_i$ and set $R_i$ 912 such that it is larger than β% of the match values in $Y_i$.

(4.6) Test Results

A variety of tests have been performed on the disclosed invention showing its ability to rapidly acquire an effective set of templates with a minimal amount of data. In some recent experiments with the method, the system was able to analyze side-channel data from a short 15-minute run of a vehicle over various driving conditions. The vehicle data was analyzed in just a single pass with the method and the method was able to obtain a set of vehicle states that matched with 90% accuracy to vehicle states identified by a secondary means through data obtained from the vehicle CAN bus. This ability to rapidly train from limited data is not found in current machine learning methods and is a marked technological improvement over the prior art.

(4.7) Example Implementations

The system as described herein has a variety of implementations. As a non-limiting example can be implemented within a vehicle to address issues related to cybersecurity for the vehicle. Thus, in one embodiment, the invention is related to the problem of cyber intrusion detection for vehicles, and in particular automobiles. The growing media attention to hacked cars has made it very clear that many commercial automobiles are potentially vulnerable to life-threatening cyber-attacks. This invention addresses the problem of detecting the presence of such attacks before they can cause serious harm. However, while the analysis described in this disclosure is focused on comparison of side-channel data to CAN bus data, which is particular to automobiles, there are similar data busses in other vehicles such as aircraft to which these same analysis techniques could apply. Given these similarities, the potential application of this invention could range anywhere from providing a cyber intrusion monitor for automobiles all the way to cyber intrusion monitoring for commercial aircraft. More broadly speaking, this invention could be applied to any cyber-physical system. Some non-limiting examples include manufacturing machinery, watercraft, and submarines, trains, medical devices, building automation systems, etc.

Figure 10:
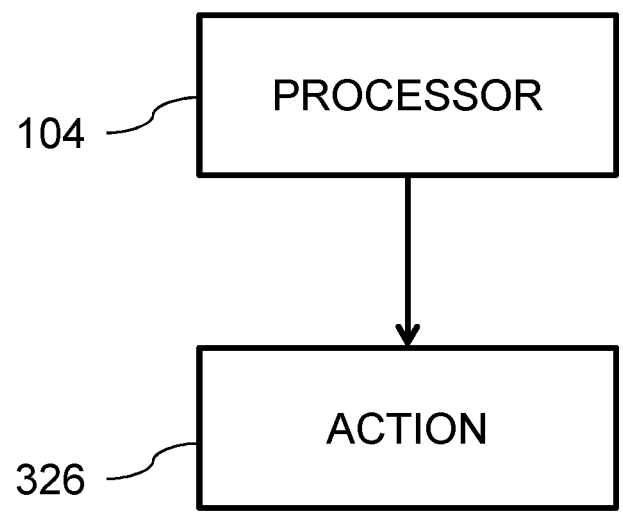
FIG. 10 is a block diagram depicting control of a device according to various embodiments.

As noted above and as further illustrated in FIG. 10, when a sufficient number of state mismatches occur within a specified time window, the one or more processors 104 operating the vehicle state detection module initiates an action 326. For example, the vehicle state detection module outputs alerts or warnings to the driver, or may possibly trigger a special safe-mode for the vehicle to switch out of any modes that might allow a hacker to take over control (such as turning off internet or online access, or causing the vehicle to brake and cease operation until the system is serviced to review any cyber threats, etc.).

The alert can be a warning message or instructions to the vehicle operator (e.g., driver, pilot) indicating a cyber security issue, with detailed instructions regarding an operation to perform (e.g., power off the vehicle, perform a steering operation, perform a braking operation, obtain mechanical service). Other examples of the action 326 include causing the vehicle (or other device in which the system is implemented) to perform a physical action, such as braking and slowing to stop and then shutting down the system (and/or vehicle, etc.) to prevent any further breach; or severing all transmission communication channels from the vehicle or system, etc.

As yet another example, for a moving vehicle, the system can implement an action 326 as the safe-mode. Here, there may be a secondary set of control routines that have the minimal essential functionality to control the vehicle, but would provide enough functionality to allow a user to get safely to a mechanic. Shutting off all incoming communication channels from the external world would also be desirable since that would block further interaction with any hacker.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for cyber-attack detection within cyber-physical systems, the system comprising:
a side-channel signal acquisition block, the side-channel signal acquisition block being operable for performing operations of:
obtaining a time-varying analog side-channel signal from components within the cyber-physical system;
converting the time-varying analog side-channel signal to a digital side-channel signal;
a state detection block, the state detection block being operable for performing operations of:
identifying a time-series of system states based on the digital side-channel signal, wherein in identifying the time-series of system states based on the digital side-channel signal, the state detection block includes a side-channel template learning and acquisition block that performs an operation of storing new side-channel signal templates and retrieving and updating existing side-channel signal templates;
comparing the time-series of system states with software states as generated by the cyber-physical system components, such that when the software states are unmatched with the time-series of system states, designating a side-channel security breach; and
causing the cyber-physical system to implement an action based on the side-channel security breach.

2. The system as set forth in claim 1, wherein the side-channel template learning and acquisition block separates the digital side-channel signal into a series of fixed-size signal blocks, and further performs on each fixed-size signal block operations of:
determining a match score for each existing side-channel signal template;
performing a match of each existing side-channel signal template to a fixed-size signal block, such that:
if there are no existing side-channel signal templates, then designating a number of matching signal templates as zero; and
if there are existing side-channel signal templates, then generating a match score for each matching side-channel signal templates.

3. The system as set forth in claim 2, further comprising an operation of comparing the match scores to a threshold value associated with each matching side-channel signal template to determine if there are one or more side-channel signal templates above the threshold.

4. The system as set forth in claim 3, wherein when there are zero matching side-channel signal templates, then the digital side-channel signal is considered to represent an unrecognized state, and a new side-channel signal template is generated for the unrecognized state.

5. The system as set forth in claim 3, wherein when there is one matching side-channel signal template, the digital side-channel signal is considered to be a recognized state and the matching side-channel signal template is evolved.

6. The system as set forth claim 5, wherein the matching side-channel signal template is evolved by finding additional matches to the matching side-channel signal template and combining those matches with an original matching side-channel signal template to average out noise.

7. The system as set forth in claim 3, wherein when there are two or more matching side-channel signal templates, then a selection procedure is employed to select a best matching side-channel signal template.

8. The system as set forth in claim 3, wherein the side-channel signal acquisition block further comprises a differential amplifier electronically connected across a fuse within a vehicle components module to generate the time-varying analog side-channel signal.

9. The system as set forth in claim 3, wherein the threshold value for comparing match scores is different for each template and each threshold is adjusted according to the set of recent match scores achieved for associated templates.

10. The system as set forth in claim 1, wherein the cyber-physical system is a vehicle, and wherein causing the cyber-physical system to implement an action includes triggering a safe-mode for the vehicle.

11. The system as set forth in claim 10, wherein triggering the safe-mode includes causing the vehicle to cease operation.

12. A method for cyber-attack detection within cyber-physical systems, the method comprising acts of:
obtaining a time-varying analog side-channel signal from components with a cyber-physical system;
converting the time-varying analog side-channel signal to a digital side-channel signal;
identifying a time-series of system states based on the digital side-channel signal, wherein identifying the time-series of system states based on the digital side-channel signal further comprises an action of performing an operation of storing new side-channel signal templates and retrieving and updating existing side-channel signal templates;
comparing the time-series of system states with software states as generated by cyber-physical system components, such that when the software states are unmatched with the time-series of system states, designating a side-channel security breach; and
causing the cyber-physical system to implement an action based on the side-channel security breach.

13. The method as set forth in claim 12, further comprising operations of:
separating the digital side-channel signal into a series of fixed-size signal blocks and, further performing on each fixed-size signal block operations of:
determining a match score for each existing side-channel signal template;
performing a match of each existing side-channel signal template to a fixed-size signal block, such that:
if there are no existing side-channel signal templates, then designating a number of matching signal templates as zero; and
if there are existing side-channel signal templates, then generating a match score for each matching side-channel signal templates.

14. The method as set forth in claim 13, further comprising an operation of comparing the match scores to a threshold value associated with each matching side-channel signal template to determine if there are one or more side-channel signal templates above the threshold.

15. The method as set forth in claim 14, wherein when there are zero matching side-channel signal templates, then the digital side-channel signal is considered to represent an unrecognized state, and a new side-channel signal template is generated for the unrecognized state.

16. The method as set forth in claim 14, wherein when there is one matching side-channel signal template, the digital side-channel signal is considered to be a recognized state and the matching side-channel signal template is evolved.

17. The method as set forth claim 16, wherein the matching side-channel signal template is evolved by finding additional matches to the matching side-channel signal template and combining those matches with an original matching side-channel signal template to average out noise.

18. The method as set forth in claim 14, wherein when there are two or more matching side-channel signal templates, then a selection procedure is employed to select a best matching side-channel signal template.

19. The method as set forth in claim 14, wherein the side-channel signal acquisition block further comprises a differential amplifier electronically connected across a fuse within a vehicle components module to generate the time-varying analog side-channel signal.

20. The method as set forth in claim 14, wherein the threshold value for comparing match scores is different for each template and each threshold is adjusted according to the set of recent match scores achieved for associated templates.

21. The method as set forth in claim 12, wherein the cyber-physical system is a vehicle such that causing the cyber-physical system to implement an action includes triggering a safe-mode for the vehicle.

22. The method as set forth in claim 21, wherein triggering the safe-mode includes causing the vehicle to cease operation.

23. A computer program product for cyber-attack detection within cyber-physical systems, the computer program product comprising:
  a non-transitory computer-readable medium having executable instructions encoded thereon, such that upon execution of the instructions by one or more processors, the one or more processors perform operations of:
    obtaining a time-varying analog side-channel signal from components with a cyber-physical system;
    converting the time-varying analog side-channel signal to a digital side-channel signal;
    identifying a time-series of system states based on the digital side-channel signal, wherein identifying the time-series of system states based on the digital side-channel signal further comprises an action of performing an operation of storing new side-channel signal templates and retrieving and updating existing side-channel signal templates;
    comparing the time-series of system states with software states as generated by cyber-physical system components, such that when the software states are unmatched with the time-series of system states, designating a side-channel security breach; and
    causing the cyber-physical system to implement an action based on the side-channel security breach.

\* \* \* \* \*